United States Patent [19]
Atsuta

[11] Patent Number: 6,072,267
[45] Date of Patent: *Jun. 6, 2000

[54] VIBRATION WAVE MOTOR

[75] Inventor: Akio Atsuta, Yokosuka, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/906,095

[22] Filed: Aug. 5, 1997

Related U.S. Application Data

[63] Continuation of application No. 08/494,223, Jun. 23, 1995, abandoned.

[30] Foreign Application Priority Data

Jun. 27, 1994 [JP] Japan .................................. 6-144531

[51] Int. Cl.[7] .................................................. H01L 41/08
[52] U.S. Cl. ............................ 310/323.06; 310/316.02; 310/314; 310/359
[58] Field of Search .............................. 310/323, 328, 310/316, 317, 319, 314, 325

[56] References Cited

U.S. PATENT DOCUMENTS

| | | | |
|---|---|---|---|
| 3,185,869 | 5/1965 | Shoor | 310/315 |
| 4,570,098 | 2/1986 | Tomita et al. | 310/346 |
| 4,600,851 | 7/1986 | Isayama et al. | 310/317 X |
| 4,841,191 | 6/1989 | Takata et al. | 310/317 |
| 5,134,333 | 7/1992 | Atsuta | 310/323 |
| 5,231,325 | 7/1993 | Tamai et al. | 310/323 |
| 5,247,221 | 9/1993 | Atsuta | 310/323 |
| 5,287,036 | 2/1994 | Penunuri | 310/313 R |
| 5,298,829 | 3/1994 | Tsukimoto et al. | 310/323 |
| 5,300,850 | 4/1994 | Okumura et al. | 310/323 |
| 5,410,204 | 4/1995 | Imabayashi et al. | 310/323 |
| 5,424,601 | 6/1995 | Arnolds et al. | 310/315 |
| 5,430,341 | 7/1995 | Summer | 310/316 |
| 5,517,073 | 5/1996 | Ohkuma | 310/315 |

FOREIGN PATENT DOCUMENTS

| | | |
|---|---|---|
| 3289375 | 12/1991 | Japan . |
| 1331100 | 9/1973 | United Kingdom ................ 310/314 |

*Primary Examiner*—Mark O. Budd
*Attorney, Agent, or Firm*—Fitzpatrick, Cella, Harper & Scinto

[57] ABSTRACT

This invention relates to a vibration wave motor which obtains a driving force by vibrating an elastic member upon application of a frequency signal to a piezoelectric element arranged in the elastic member. Especially, there is provided a motor of this type, which incorporates a capacitance or inductance as an external member required for driving the motor in a motor alone by integrally stacking the member on the elastic member.

7 Claims, 10 Drawing Sheets

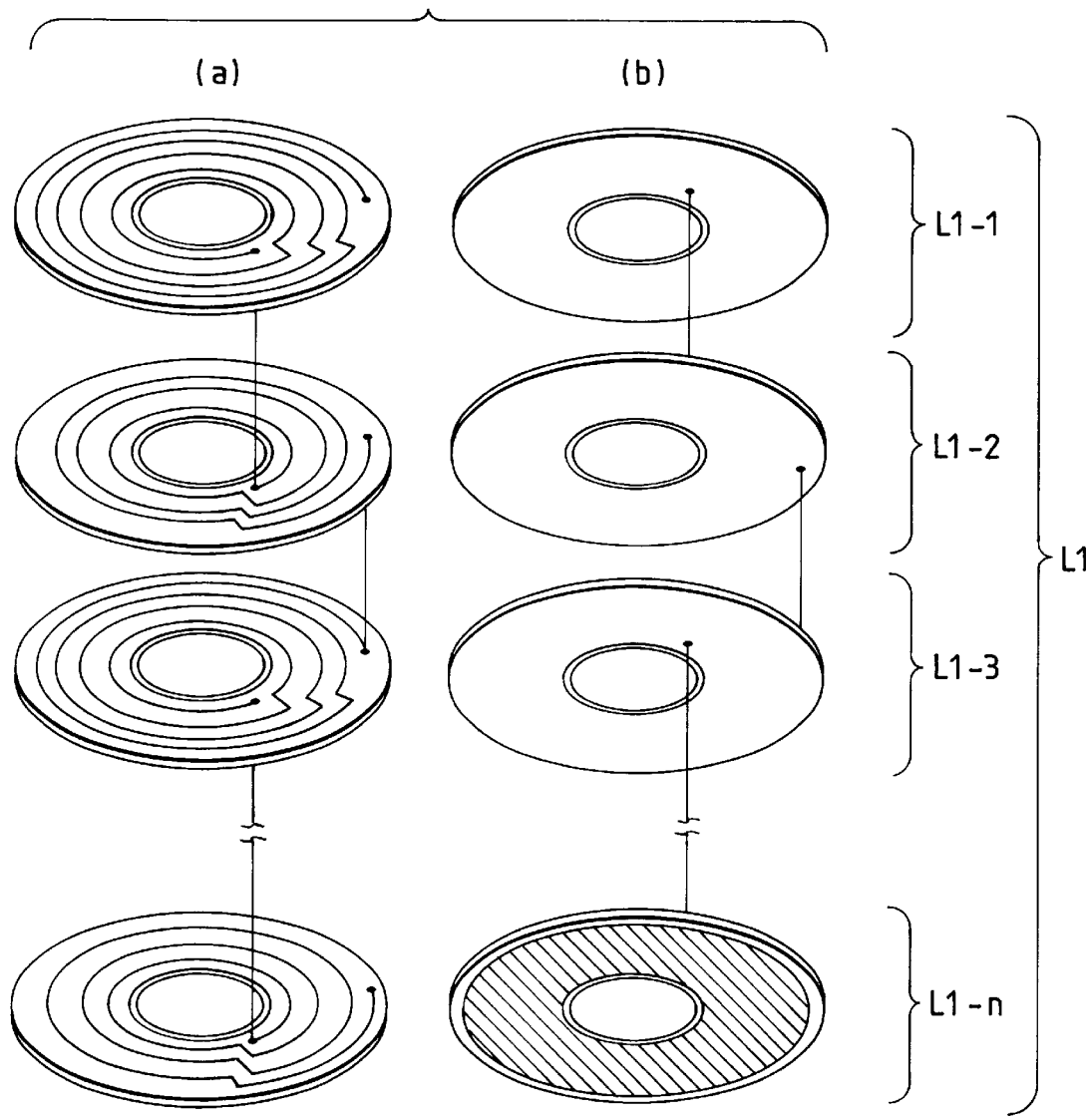

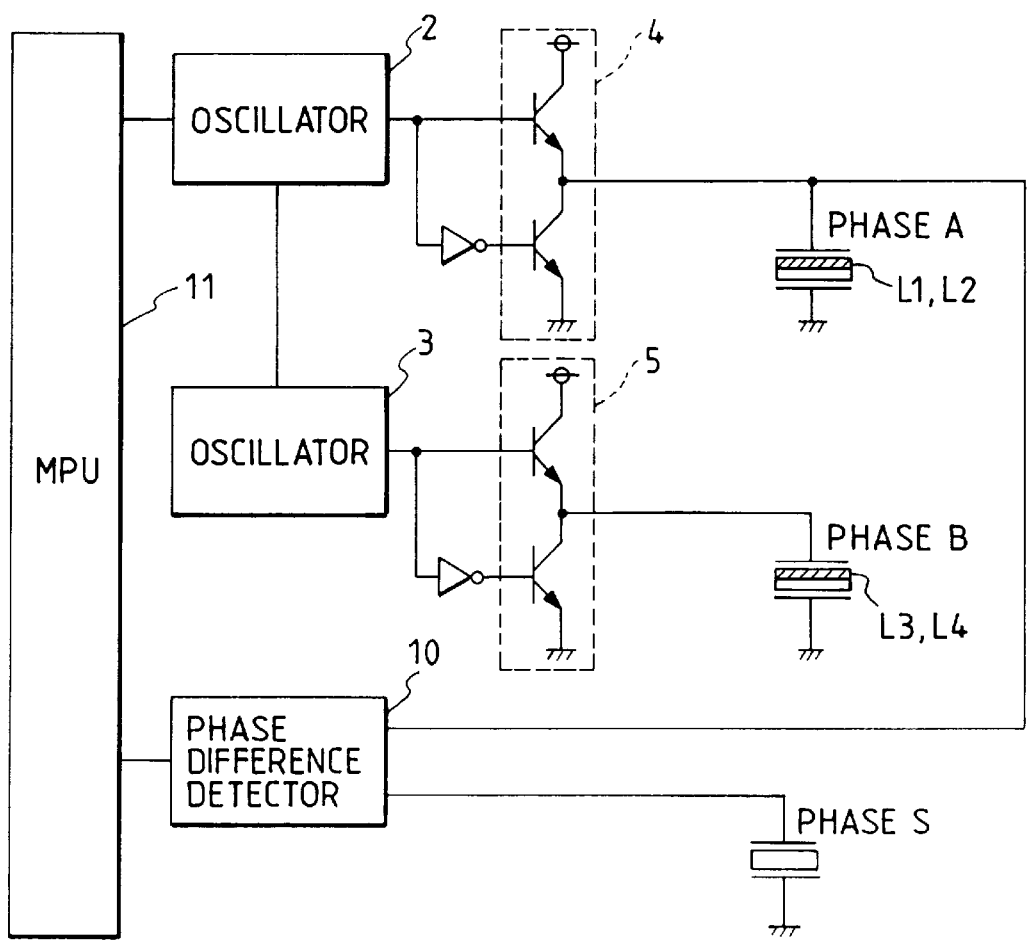

VIBRATION WAVE MOTOR

This application is a continuation of application Ser. No. 08/494,223 filed Jun. 23, 1995, now abandoned.

BACKGROUND OF THE INVENTION

1. Field of the Invention

The present invention relates to a vibration wave device such as an ultrasonic wave motor, which utilizes the resonance of a vibrator.

2. Related Background Art

Recently, a vibration wave motor called an ultrasonic wave motor or a piezoelectric motor has been developed and put into practical applications by the present applicant. As is well known, the vibration wave motor is a new type of non-electromagnetic driven motor, in which an alternative voltage is applied to an electro-mechanical energy conversion element such as a piezoelectric element or an electro-strictive element to cause it to generate a high-frequency vibration, and the vibration energy is picked up as a continuous mechanical motion. Since the principle of the operation of this motor has already been described in many laid-open patent applications such as Japanese Laid-Open Patent Application No. 3-289375 by the present invention, a detailed description thereof will be omitted.

FIG. 15 is a side view of a conventional rod-shaped ultrasonic wave motor and a diagram showing the voltage to be applied to piezoelectric elements constituting the motor and output voltages therefrom. A vibrator 1 constitutes the rod-shaped ultrasonic wave (vibration wave) motor, and comprises a coupled body of piezoelectric elements or electro-strictive elements and elastic members.

The piezoelectric element portion of the vibrator portion 1 comprises A-phase driving piezoelectric elements a1 and a2, B-phase driving piezoelectric elements b1 and b2, and a vibration detection piezoelectric element s1. When an A-phase application voltage is applied to a portion sandwiched between the A-phase piezoelectric elements a1 and a2 via an electrode plate A-d, and a B-phase application voltage is applied to a portion sandwiched between the B-phase piezoelectric elements b1 and b2 via an electrode plate B-d, these piezoelectric elements are driven.

The surfaces, opposite to the corresponding electrode plates, of the A- and B-phase piezoelectric elements a1, a2, b1, and b2 are set at the GND potential via electrode plates GND. One surface (the B side of s1 in FIG. 15) of the vibration detection piezoelectric element s1 is similarly set at the GND potential, and a signal is picked up from the other surface via an electrode plate S-d. The signal pickup surface side of the vibration detection piezoelectric element s1 contacts a metal block, which is insulated from the GND potential using an insulating sheet. Therefore, an output voltage corresponding to a vibration can be directly obtained from the vibration detection piezoelectric element s1. Then, a resonance frequency or the like is calculated on the basis of the magnitude of the output voltage, the phase differences from the driving voltages, and the like.

FIG. 16 shows a driving circuit using the above-mentioned ultrasonic wave motor. This circuit includes an oscillator 2 for generating an alternative voltage, a 90° phase shifter 3, switching circuits 4 and 5 for switching a power supply voltage using the alternative voltages from the oscillator and the phase shifter, and booster inductance elements 6 and 7 and capacitance elements 8 and 9 for amplifying the pulse voltages switched by the switching circuits 4 and 5. The boost amounts change depending on the values of these inductance and capacitance elements. More specifically, the input electric power characteristics to the motor can be changed depending on the values of these inductance and capacitance elements. The circuit also includes a phase difference detector for detecting the signal phase difference between a driving electrode A and a vibration detection electrode s1. A control microcomputer 11 sets the driving frequency, and the ultrasonic wave motor is driven at the set frequency.

However, the conventional arrangement of the driving circuit for the ultrasonic wave motor requires electric elements such as the switching circuits, the booster inductance elements, the capacitance elements, and the like in addition to the ultrasonic wave motor, resulting in high parts cost. In addition, in products such as still cameras, video cameras, and the like which require size reductions, it is difficult to mount the above-mentioned circuit on a circuit board.

In particular, the conventional ultrasonic wave motor shown in FIG. 15 can realize an ultra size reduction (e.g., its diameter is equal to or smaller than that of a pencil), and hence, the size of the driving circuit to be mounted on a board such as a flexible printed board is preferably reduced as much as possible.

SUMMARY OF THE INVENTION

One aspect of the application has as its object to provide a vibration wave motor which can solve the above-mentioned conventional problems, and can simplify the arrangement of a driving circuit.

One aspect of the application is to provide a vibration wave motor which vibrates a vibrator by applying frequency voltages to electromechanical energy conversion elements arranged in an elastic member, and in which electrical elements such as inductance elements, capacitance elements, and the like, which constitute a driving circuit are integrally stacked on the vibrator.

Other objects of the present invention will become apparent from the following description of the embodiments taken in conjunction with the accompanying drawings.

BRIEF DESCRIPTION OF THE DRAWINGS

FIG. 7 is exploded perspective view of inductance elements shown in FIG. 6, in which (a) in FIG. 7 shows the upper surface side, and (b) in FIG. 7 shows the lower surface side;

FIG. 8 is a schematic view showing a piezoelectric element portion of an ultrasonic wave motor according to the fifth embodiment of the present invention;

FIG. 9 is a block diagram showing a driving circuit for the ultrasonic wave motor shown in FIG. 8;

DETAILED DESCRIPTION OF THE PREFERRED EMBODIMENTS

Figure 1:
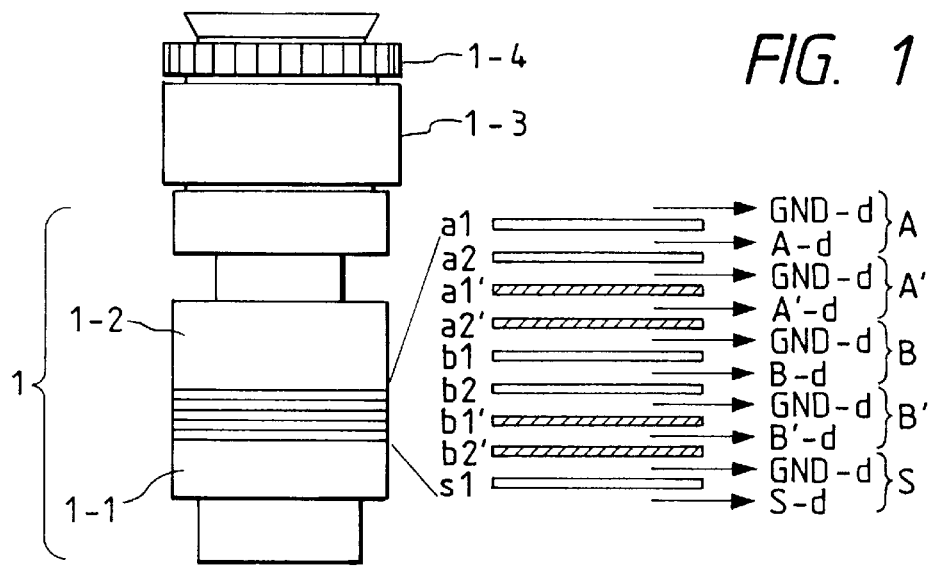
FIG. 1 is a schematic view showing an ultrasonic wave motor according to the first embodiment of the present invention.
Figure 2:
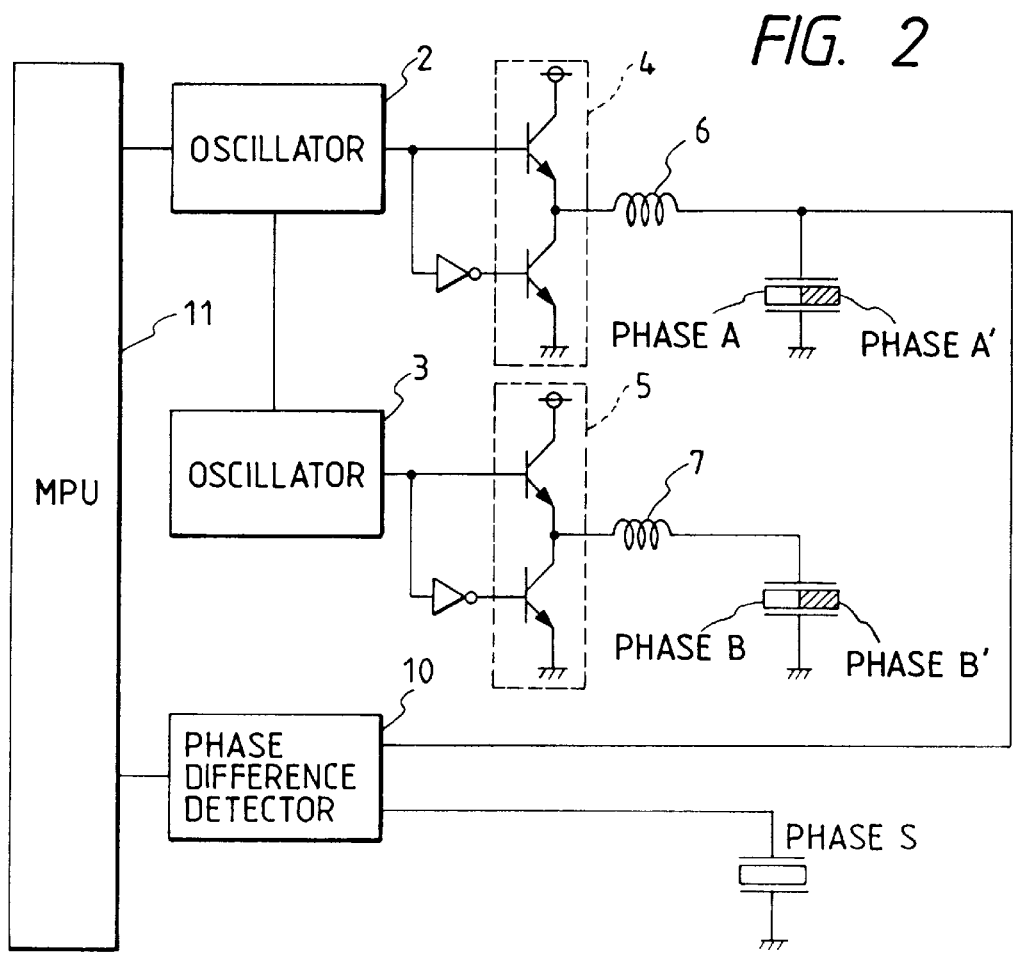
FIG. 2 is a block diagram showing a driving circuit of the ultrasonic wave motor shown in FIG. 1.

FIG. 1 is a schematic view of an ultrasonic wave motor according to the first embodiment of the present invention, and FIG. 2 is a block diagram showing a driving circuit for driving the ultrasonic wave motor shown in FIG. 1. The same reference numerals in FIGS. 1 and 2 denote the same parts as in the prior art shown in FIGS. 15 and 16, and a detailed description thereof will be omitted.

Figure 15:
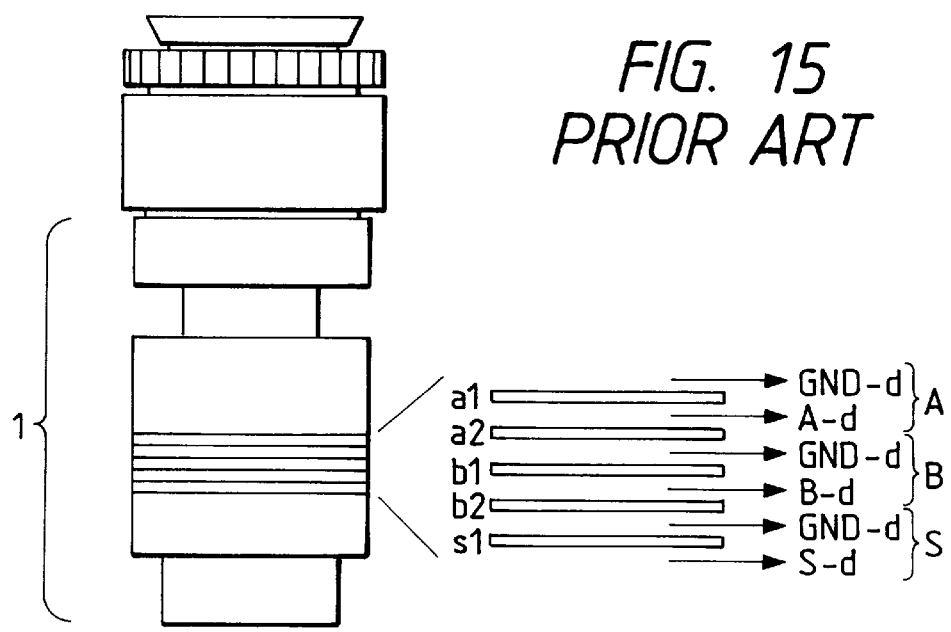
FIG. 15 is a schematic view of a conventional ultrasonic wave motor.
Figure 16:
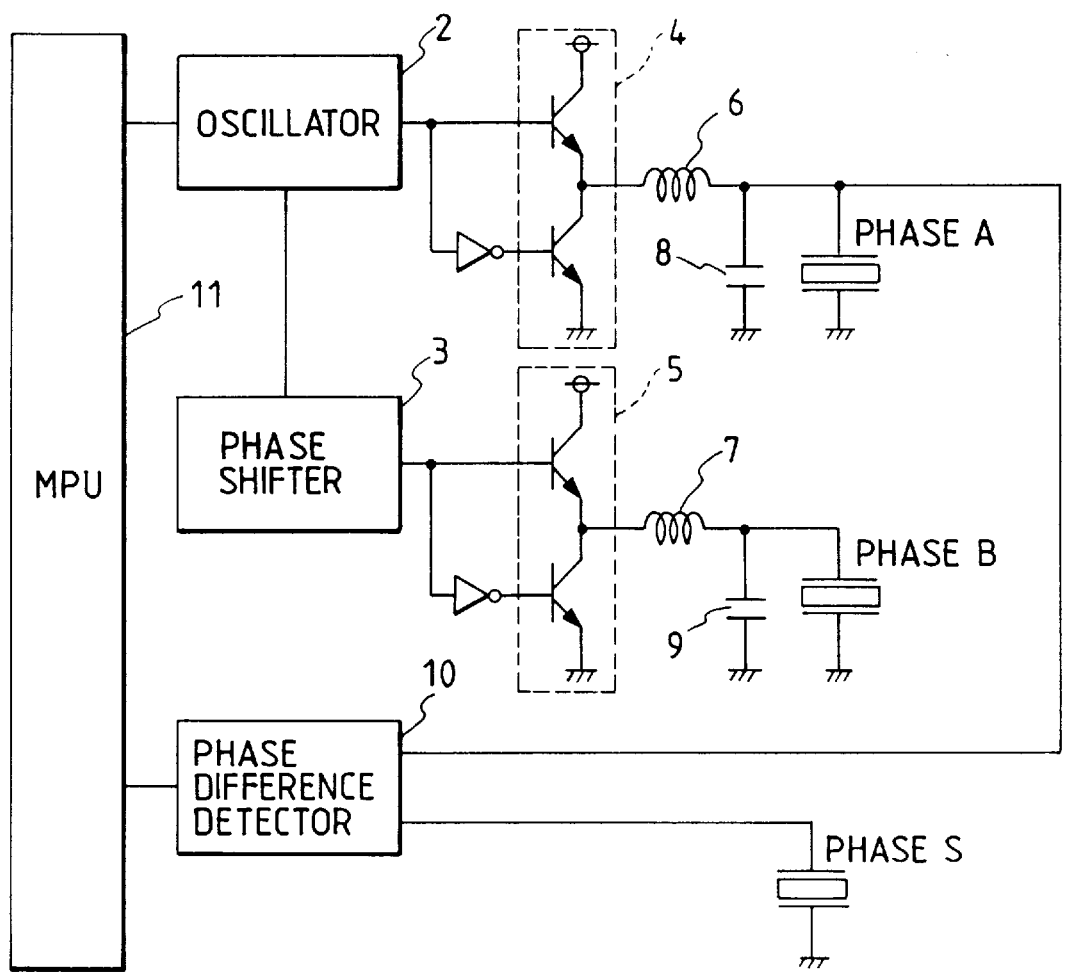
FIG. 16 is a block diagram showing a driving circuit for the ultrasonic wave motor shown in FIG. 15.

As in the prior art shown in FIG. 15, this embodiment relates to a rod-shaped ultrasonic wave motor as a vibration wave device. The driving principle of this ultrasonic wave motor will be briefly described below. Alternative voltages with different phases are applied to A- and B-phase driving piezoelectric elements a1, a2, b1, and b2 arranged between vibration elastic members 1-1 and 1-2, which constitute a vibrator and consist of, e.g., a metal with low vibration damping characteristics so as to apply flexural vibrations of the rod of the vibrator to the vibrator. Upon synthesis of these vibrations, surface particles on the driving surface make an elliptic motion in a plane having an axis perpendicular to the central axis as the center, thereby rotating a member which is in press contact with the driving surface, e.g., a rotor 1-3, by a frictional force. The driving force of the rotor 1-3 is transmitted to an output member 1-4 having a gear portion on its outer surface, and is output to an external device.

In this embodiment, booster capacitance elements, which are arranged in correspondence with both the A and B phases in a conventional circuit, are omitted from a driving circuit for driving the vibrator, and instead, capacitive elements a1', a2', b1', and b2' having a function of a booster capacitance are arranged in the vibrator. Note that the driving piezoelectric elements are subjected to a polarization treatment to have different directions of polarization on the two sides of their diameter portions.

More specifically, the capacitive elements a1' and a2' defining a booster capacitance for the A phase for driving constitute an A' phase, and similarly, the capacitive elements b1' and b2' defining a booster capacitance for the B phase for driving constitute a B' phase. An electrode plate A'-d is added between the elements a1' and a2' constituting the A' phase, and an electrode plate B'-d is added between the elements b1' and b2' constituting the B' phase.

The A' and B' phases are respectively connected in parallel with the A and B phases (A-d and A'-d are connected, and B-d and B'-d are connected), and are then connected to booster inductance elements 6 and 7 shown in FIG. 2. In this case, the booster capacitance elements 8 and 9 described in the prior art are omitted. In order to increase the capacitance components, the number of arrangements as those of the A' and B' phases can be increased.

According to this embodiment, booster capacitance elements outside the motor can be omitted.

In this embodiment, the capacitance elements are connected in parallel with the piezoelectric elements which are subjected to a polarization treatment for driving. However, in order to decrease the capacitance of the motor, the capacitance elements can be connected in series with the piezoelectric elements.

This embodiment uses a total of four elements, i.e., two driving piezoelectric elements and two booster capacitance elements for driving one mode. The number of elements can be similarly increased if the total number of elements is an even number. Of course, the number of each of driving piezoelectric elements and booster capacitance elements may be an odd number, and an insulating sheet which is required in the prior art when an odd number of driving piezoelectric elements is used can be omitted.

Figure 3A:
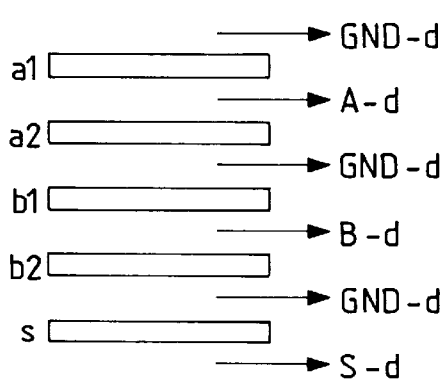
FIGS. 3A and 3B are schematic views of a piezoelectric element portion of an ultrasonic wave motor according to the second embodiment of the present invention.
Figure 3B:
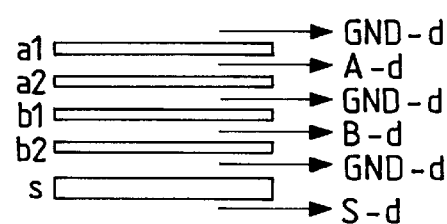

FIGS. 3A and 3B show the second embodiment of the present invention, and are schematic views showing a piezoelectric element portion of an ultrasonic wave motor of the type shown in FIG. 1.

In this embodiment, as shown in FIG. 3B, the thickness of each driving piezoelectric element is smaller than that in the prior art shown in FIG. 3A. Due to the characteristics of the piezoelectric elements, when the thickness of each piezoelectric element decreases, the capacitance increases. Therefore, the same capacitance value as that when booster capacitance elements are used can be obtained without increasing the number of piezoelectric elements.

Although not shown, by increasing the thickness of each piezoelectric element, the capacitance decreases due to the characteristics of the piezoelectric element, and a smaller capacitance value can be set.

Figure 4:
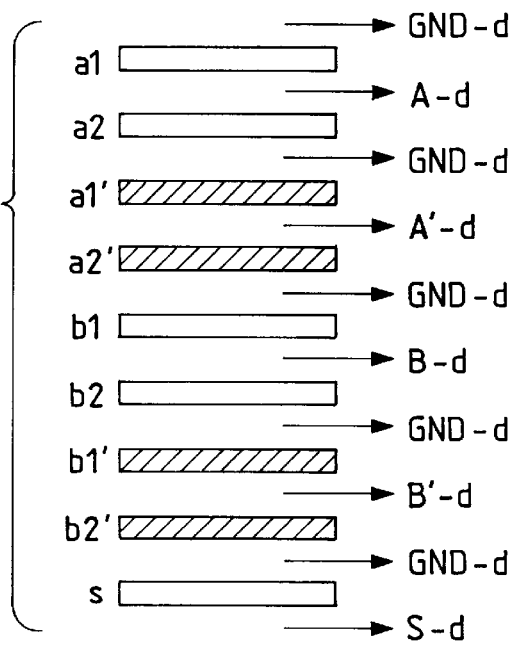
FIG. 4 is a schematic view showing a piezoelectric element portion of an ultrasonic wave motor according to the third embodiment of the present invention.

FIG. 4 shows the third embodiment of the present invention, and is a schematic view showing a piezoelectric element portion of an ultrasonic wave motor of the type shown in FIG. 1.

Figure 5A:
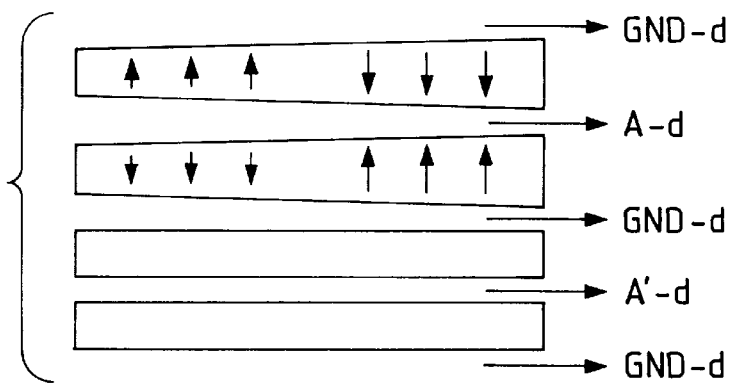
FIGS. 5A and 5B are schematic views showing the deformed states of the piezoelectric element portion shown in FIG. 4 upon driving.
Figure 5B:
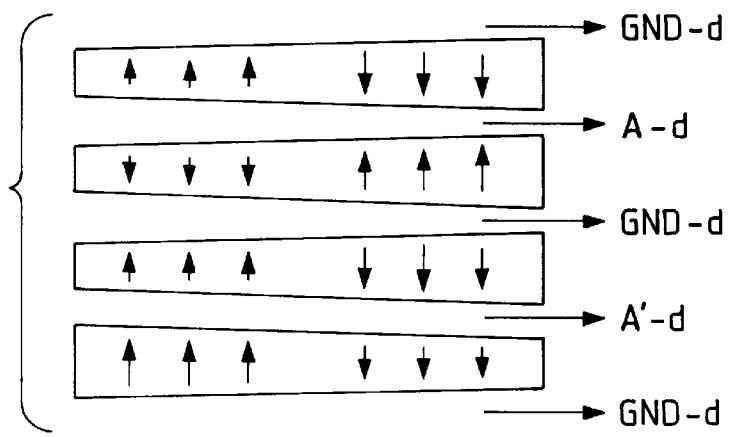

FIGS. 5A and 5B show the deformed states of the piezoelectric elements of this embodiment upon application of voltages to these elements.

In this embodiment although the number of driving piezoelectric elements is increased, added piezoelectric elements have no piezoelectric characteristics since they are as the above-mentioned capacitance element. As this means, in FIG. 5A, an added piezoelectric element (an element between GND-d and A'-d) is not subjected to any polarization treatment. The piezoelectric element, which contacts an electrode plate A-d, is polarized to have two different polarities, so that upon application of a positive potential, its right side in FIG. 5A expands and its left side in FIG. 5A contracts. Therefore, upon application of a positive voltage, the right side in FIG. 5A of this element expands, and the left side in FIG. 5A of this element contracts. On the other hand, a piezoelectric element, which contacts an electrode plate A'-d, neither expands nor contracts upon application of a voltage since it is not polarized. In this manner, since this piezoelectric element has no piezoelectric characteristics, it provides the same effect as that obtained when a capacitance element is simply added.

In FIG. 5B, two added piezoelectric elements are polarized to cancel their piezoelectric characteristics with each other. Upon application of a voltage, the right side in FIG. 5B of the piezoelectric element, which contacts the electrode plate A-d, expands, and the left side in FIG. 5B thereof contracts, as in FIG. 5A. On the other hand, since piezoelectric elements, which contact the electrode plate A'-d, are used as the capacitance elements, one element is polarized, so that its right side in FIG. 5B expands and its left side in FIG. 5B contracts upon application of a voltage, and the other element is polarized, so that its left side in FIG. 5B expands and its right side in FIG. 5B contracts upon application of a voltage. Therefore, these two elements apparently do not vibrate, and the same effect as that obtained when capacitance elements are added can be obtained.

With the above arrangement, the capacitance can be increased without changing the piezoelectric characteristics even when the number of piezoelectric elements is increased. In addition, since the same piezoelectric elements can be used for all the elements, common parts can be used, thus providing an advantage in terms of cost.

Figure 6:
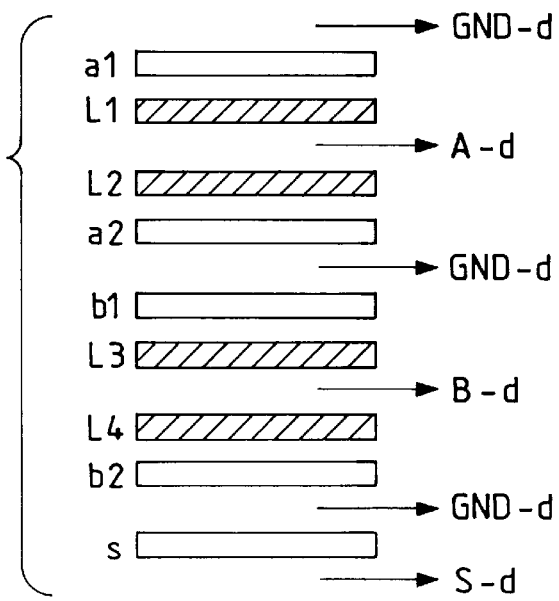
FIG. 6 is a schematic view showing a piezoelectric element portion of an ultrasonic wave motor according to the fourth embodiment of the present invention.

FIG. 6 shows the fourth embodiment of the present invention, and is a schematic view showing a piezoelectric element portion of an ultrasonic wave motor of the type shown in FIG. 1.

FIG. 7 is perspective view showing the arrangements of the upper and lower surface sides of an inductance element used in the fourth embodiment. In this embodiment, inductance elements L1, L2, L3, and L4 are respectively arranged between piezoelectric elements a1, a2, b1, and b2, and electrode plates A-d and B-d for supplying driving voltages. Each inductance element has a stacked structure shown in FIG. 7, and is integrally sintered (FIG. 7 shows the structure of the element L1). On the upper surface side shown in (a) of FIG. 7, a counterclockwise spiral electrode pattern is formed on an inductance element L1-1 from its outer periphery toward its inner periphery, and a through hole is formed on the element L1-1, so that the pattern is connected to that on a lower inductance element L1-2 at the end portion on the inner periphery side. Also, a counterclockwise spiral electrode pattern is formed on the inductance element L1-2 from its inner periphery toward its outer periphery, and a through hole is formed on the element L1-2, so that the pattern is connected to that on a lower inductance element L1-3 at the end portion on the outer periphery side. The inductance element L1-3 has the same arrangement as that of the inductance element L1-1, and these elements are similarly stacked up to the n-th inductance element L1-n. Note that an electrode is formed on the entire lower surface of only the lowermost inductance element L1-n, so as to attain an electrical connection with a PZT (piezoelectric element a1) contacting the lower surface. The upper surface of the uppermost inductance element L1-1 is electrically connected to the electrode plate A-d since it contacts the electrode plate A-d. Note that the inductance component corresponding to the electrode pattern on the upper surface of the uppermost inductance element L1-1 is wasted. When such stacked inductance element is used, an inductance component can be obtained without using any coil. When the inductance elements are connected in series with the piezoelectric elements in the motor, as shown in FIG. 6, booster inductance elements need not be arranged outside the motor unlike in the prior art. Note that FIG. 7 shows the inductance element L1, and the same applies to the elements L2 to L4.

FIG. 8 shows the fifth embodiment of the present invention, and is a schematic view showing a piezoelectric element portion of an ultrasonic wave motor of the type shown in FIG. 1. FIG. 9 is a block diagram of a driving circuit for the motor shown in FIG. 8.

In this embodiment, the thickness of each driving piezoelectric element is decreased to be smaller than that shown in FIG. 6, and inductance elements L1, L2, L3, and L4 are added. With this arrangement, switching circuit 4 and 5 shown in FIG. 9 can be directly connected to only the motor.

Figure 10:
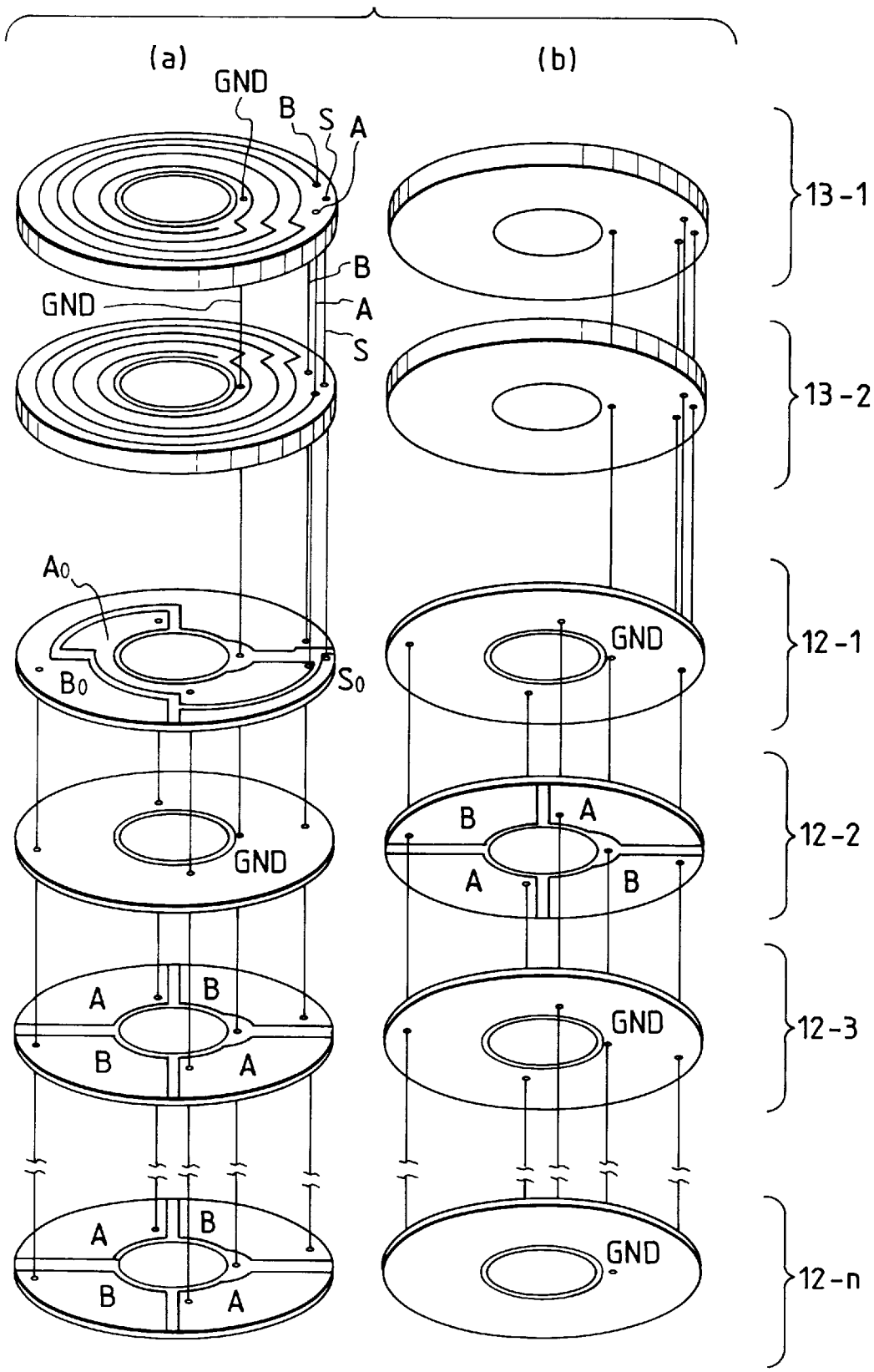
FIG. 10 is exploded perspective view of a piezoelectric element portion of an ultrasonic wave motor according to the sixth embodiment of the present invention, in which (a) in FIG. 10 shows the upper surface side, and (b) in FIG. 10 shows the lower surface side.

FIG. 10 shows the sixth embodiment of the present invention, and are perspective views showing a piezoelectric element portion of an ultrasonic wave motor of the type shown in FIG. 1.

Referring to FIG. 10, piezoelectric elements 12-1 to 12-n are stacked using, e.g., through holes. The piezoelectric element 12-1 is divided into three regions, i.e., driving electrodes A0 and B0, and a vibration detection electrode S0. On the entire lower surface of the piezoelectric element 12-1, and the entire upper surface of the piezoelectric element 12-2, an electrode is formed except for through hole portions.

On one surface of each of the piezoelectric elements 12-2 to 12-n, a cross-shaped pattern is formed to divide the surface into four regions. Of these regions, the opposing regions are respectively used for driving the A and B phases. On the other surface of each of these portions, an electrode is entirely formed except for through hole portions as in the piezoelectric element 12-1. On the piezoelectric element 12-3, the same electrode pattern as that on the piezoelectric element 12-2 is formed, and through holes are formed at symmetrical positions. If the electrode pattern is formed on one of the piezoelectric elements 12-2 and 12-3, and no electrode pattern is formed on the other portion, the same effect can be obtained. For the piezoelectric element 12-4 and subsequent portions, the combinations of the piezoelectric elements 12-2 and 12-3 are repetitively stacked to obtain an n-layered stacked element. Note that only the piezoelectric element 12-n has only one through hole.

The reason why the piezoelectric element is divided into four regions is to effectively use the driving force of the motor, as will be described in detail later. Opposing electrodes are polarized in opposite directions. These piezoelectric elements can drive an ultrasonic wave motor by applying alterative voltages with different phases to the electrodes A0 and B0 of the piezoelectric element 12-1. Inductance elements 13-1 and 13-2 have a stacked structure. This structure is substantially the same as that in the embodiment shown in FIG. 7, except that through holes are formed to connect signals for the vibration detection electrode S0 and GND, and the other driving signal. Note that through holes are alternately formed, so that the B phase extends from the inner periphery toward the outer periphery on the inductance element 13-1, and the A phase extends from the inner periphery toward the outer periphery on the inductance element 13-2, and these elements are stacked. In addition, electrodes are formed on substantially the entire lower surfaces of the inductance elements in FIG. 7, but are omitted in FIG. 10. These inductance elements 13-1 and 13-2 are respectively connected in series with the electrodes A0 and B0 of the piezoelectric element 12-1.

Note that the total capacitance of the piezoelectric elements 12 can be changed by adjusting the thickness of each piezoelectric element or the number of elements to be stacked.

When these elements 12 and 13 are simultaneously stacked, all the A, B, S, and GND can be electrically connected from the upper surface of the inductance element 13 using, e.g., a flexible circuit board. With this arrangement, cumbersome processes, e.g., a process of alternately stacking a large number of piezoelectric elements and a large number of electrode plates upon assembling of a vibrator, a process of connecting a plurality of electrode plates to, e.g., a flexible circuit board outside the motor, and the like can be omitted.

In this embodiment, the inductance elements are arranged on the piezoelectric elements, but may be arranged underneath the piezoelectric elements or both on and underneath them.

Figure 11:
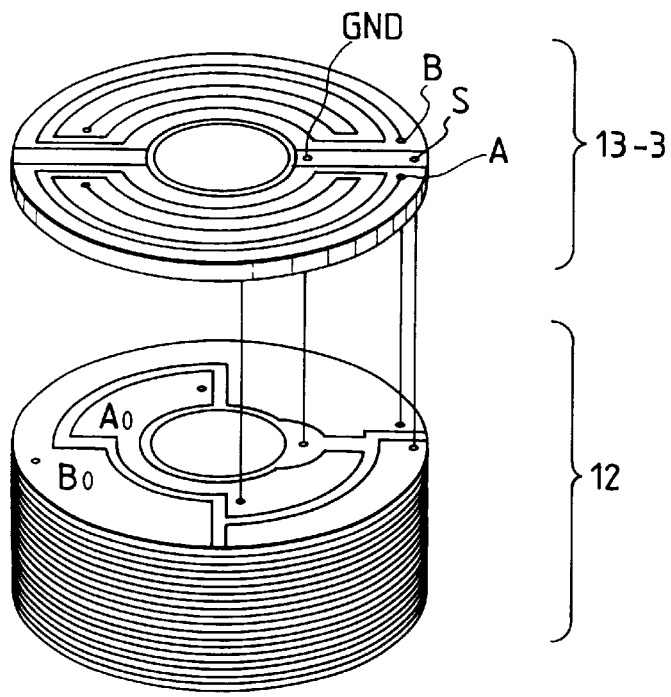
FIG. 11 is an exploded perspective view showing a piezoelectric element portion of an ultrasonic wave motor according to the seventh embodiment of the present invention.

FIG. 11 shows the seventh embodiment of the present invention, and is a perspective view showing a piezoelectric element portion of an ultrasonic wave motor of the type shown in FIG. 1. In this embodiment, a plurality of inductance elements connected to piezoelectric elements 12 for driving the respective modes are arranged on a plane including the axis of the motor. With this arrangement, no through holes for supplying electric power for another mode need be formed in the inductance element, and the inductance element is hardly influenced by induction noise from an induction element for driving another mode.

Figure 12:
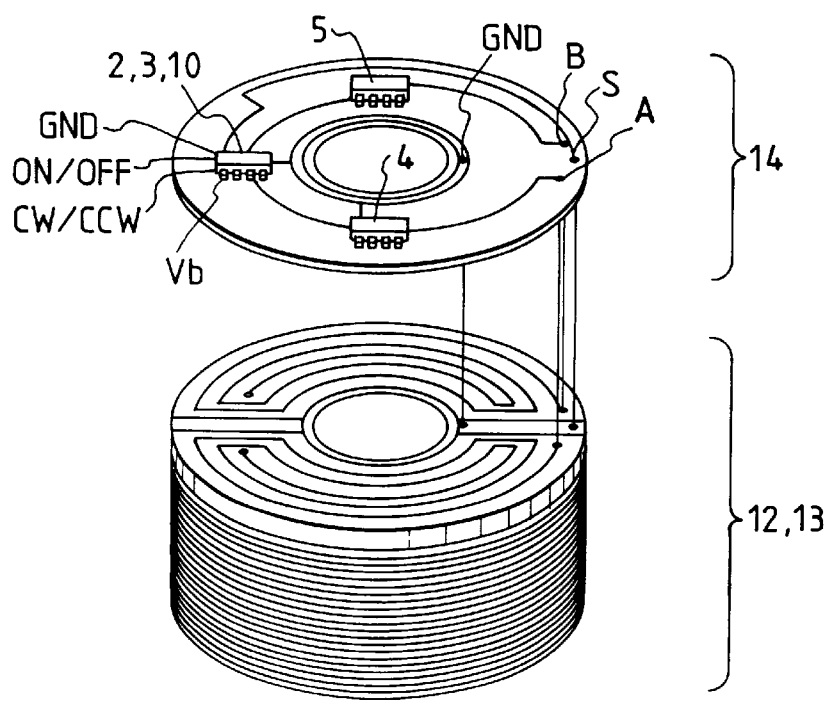
FIG. 12 is an exploded perspective view showing a piezoelectric element portion of an ultrasonic wave motor according to the eighth embodiment of the present invention.

FIG. 12 shows the eighth embodiment of the present invention, and is a perspective view showing a piezoelectric element portion of an ultrasonic wave motor of the type shown in FIG. 1.

Figure 13:
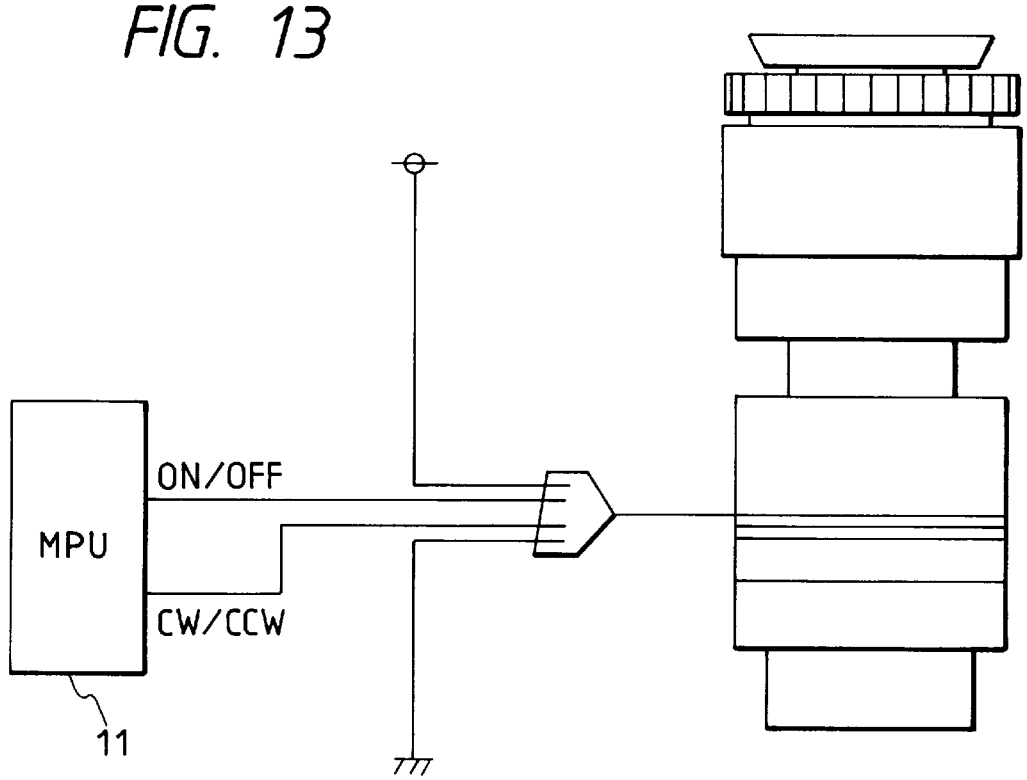
FIG. 13 is a view showing the arrangement with a driving circuit for the ultrasonic motor shown in FIG. 12.

In this embodiment, in addition to the inductance elements and the capacitance elements, switching circuits and an oscillator which oscillates to follow the resonance frequency are assembled in the motor. In this arrangement, a board 14 on which these electrical parts are mounted is flattened to have a cylindrical shape using, e.g., a resin. FIG. 13 shows a motor and a circuit diagram when the piezoelectric element portion of the eighth embodiment is used. In FIG. 12, a stacked structure of inductance elements and piezoelectric elements is represented by 12 or 13.

A power supply voltage is supplied from the upper end of the piezoelectric element portion via the flexible circuit board. Since a driving circuit used for driving the motor is assembled in the motor, an external device need only supply a power supply voltage, an ON/OFF signal, and a forward/reverse rotation (CW/CCW) signal. Therefore, the driving circuit with a simple arrangement shown in FIG. 13 can be realized.

Figure 14:
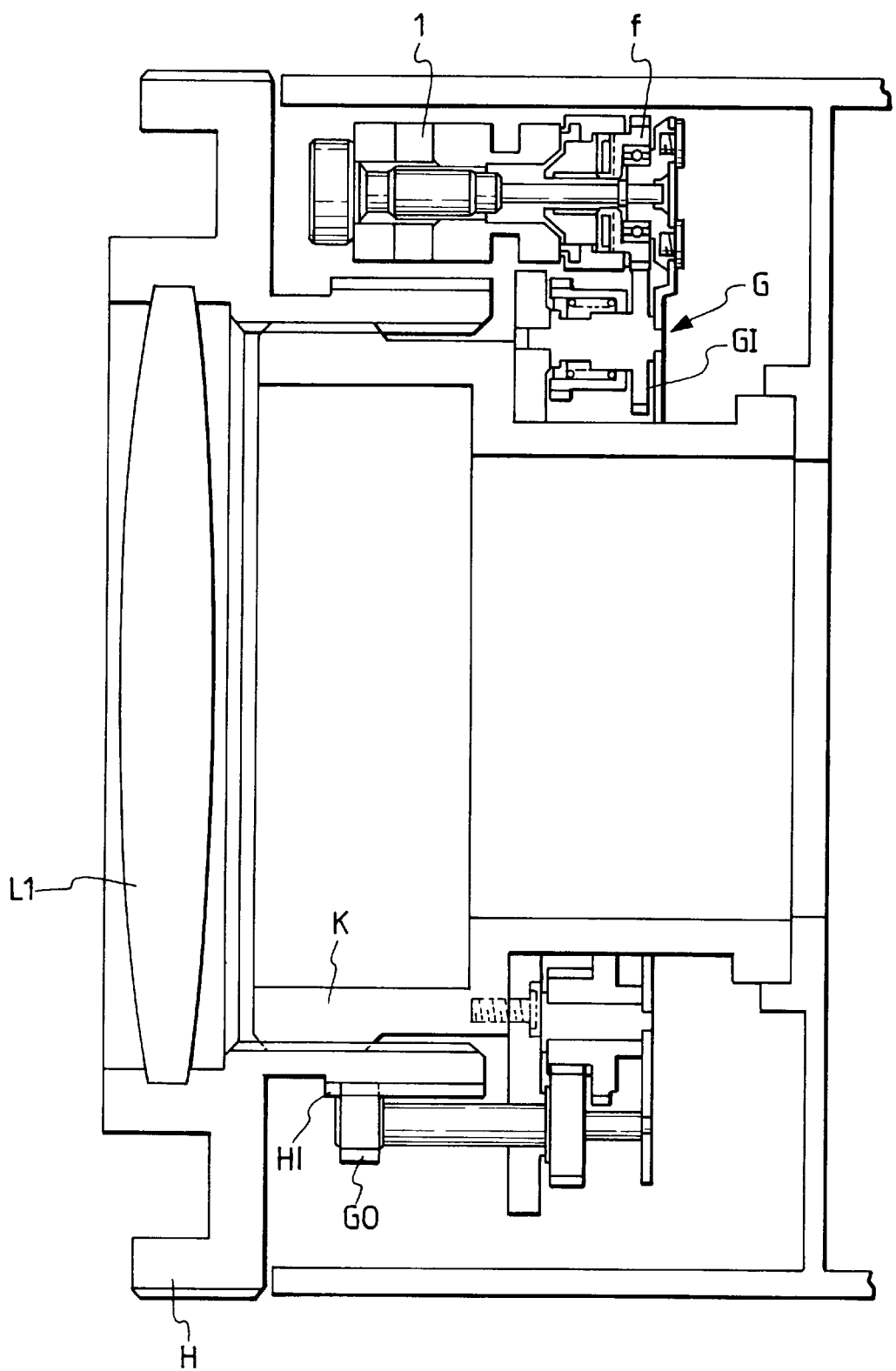
FIG. 14 is a sectional view showing a driving device using an ultrasonic wave motor according to the present invention.

FIG. 14 shows a driving device using the ultrasonic wave motor according to the present invention. Although the basic structure of this rod-shaped ultrasonic wave motor is the same as that of the prior art, the piezoelectric element portion has means for omitting external parts.

A gear f integrally assembled with the ultrasonic wave motor meshes with an input gear GI of a gear transmission mechanism G, and its output gear GO meshes with a gear HI formed on a lens holding portion H for holding a lens L1. The lens holding member H is helicoid-coupled to a stationary cylinder K, and is rotated by the driving force of the ultrasonic wave motor via the gear transmission mechanism G, thus attaining a focusing operation.

In each of the above embodiments, the vibrator of the rod-shaped ultrasonic wave motor has been exemplified. However, a vibration wave device according to the present invention is not limited to this vibrator shape. For example, the vibrator may have an annular shape, an oval shape, or the like. On the other hand, the present invention may be utilized in a mechanism in which the driving surface of a vibrator is in press contact with a stationary rail-shaped stator to move the vibrator, or in paper feeding means for a paper feeding mechanism in which a sheet member such as a paper sheet is in press contact with the driving surface of a vibrator to convey the sheet member.

What is claimed is:

1. A vibration type motor which has an electro-mechanical energy conversion element part sandwiched between first and second elastic members, and excites a vibration therein by applying a frequency signal to the electro-mechanical energy conversion element part, comprising:

a planar member portion which is arranged to have a surface face-to-face with a surface of said electro-mechanical energy conversion element part, said planar member portion constituting an inductance element which is electrically connected in series with said electro-mechanical energy conversion element part.

2. A vibration type motor comprising:

a first elastic member;

a second elastic member;

a nonpolarized piezoelectric element member;

an electromechanical energy conversion element part comprising at least one planar piezoelectric element member; and an element member;

wherein said electromechanical energy conversion element part, said element member and said nonpolarized piezoelectric element member are stacked in that order and sandwiched between said first elastic member and said second elastic member and said electromechanical energy conversion element part excites a vibration in said first elastic member and said second elastic member by applying a frequency signal to said at least one planar piezoelectric element member, said element member having a surface connected face-to-face with a surface of said at least one planar piezoelectric element member and being electrically connected in parallel with said at least one planar piezoelectric element member and said nonpolarized piezoelectric element member.

3. A vibration type motor which includes a drive element portion having a plurality of plate-like piezoelectric element members and generates a driving force by applying a frequency signal to said plurality of plate-like piezoelectric element members of said drive element portion to vibrate the drive element portion, said motor comprising:

a piezoelectric element portion disposed in a stacked direction relative to said plurality of piezoelectric element members of said drive element portion, said piezoelectric element portion including at least first and second plate-like piezoelectric element members, said first and second piezoelectric element members being disposed in the stacked direction, said first piezoelectric element member having an electromechanical characteristic where, when a predetermined voltage is applied to the surface of said first piezoelectric element member, a left side portion of said first piezoelectric element member shrinks and a right side portion of said first piezoelectric element member elongates in the stacked direction, and said second piezoelectric element member having an electromechanical characteristic where, when said predetermined voltage is applied to the surface of said second piezoelectric element member, a left side portion of said second piezoelectric element member elongates and a right side portion of said second piezoelectric member shrinks in the stacked direction.

4. A vibration type motor according to claim 3, wherein said piezoelectric element portion and said drive element portion are sandwiched between first and second elastic members.

5. A vibration type motor according to claim 1, wherein said planar member portion is constituted by a plurality of planar members each of which is provided with a pattern electrode of spiral shape, said plurality of planar members being connected to each other in series.

6. A vibration type motor according to claim 3, wherein said piezoelectric element portion is connected in parallel with said drive element portion.

7. A vibration type motor which has a planar electro-mechanical energy conversion element portion sandwiched between first and second elastic members, and excites a vibration therein by applying a frequency signal to the electro-mechanical energy conversion element portion, comprising:

at least one planar member which is arranged to have a surface face to face with a surface of the electro-mechanical energy conversion element portion, said member constituting an inductance element, said inductance element being electrically connected in series with said electro-mechanical energy conversion element portion.

* * * * *

UNITED STATES PATENT AND TRADEMARK OFFICE
CERTIFICATE OF CORRECTION

PATENT NO. : 6,072,267

DATED : June 6, 2000

INVENTOR(S) : AKIO ATSUTA

It is certified that error appears in the above-identified patent and that said Letters Patent is hereby corrected as shown below:

At [56] References Cited

U.S. PATENT DOCUMENTS
    "3289375" should read --3-289375--.

Signed and Sealed this

Seventeenth Day of April, 2001

*Attest:*

NICHOLAS P. GODICI

*Attesting Officer*     Acting Director of the United States Patent and Trademark Office